United States Patent
Bettenwort et al.

(10) Patent No.: US 9,350,162 B2
(45) Date of Patent: *May 24, 2016

(54) DETERMINATION OF THE FAULT CURRENT COMPONENT OF A DIFFERENTIAL CURRENT

(71) Applicant: SMA Solar Technology AG, Niestetal (DE)

(72) Inventors: Gerd Bettenwort, Kassel (DE); Sebastian Bieniek, Niestetal (DE); Lutz Eidenmueller, Brombachtal (DE); Olaf Proeve, Hann. Muenden (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 774 days.

This patent is subject to a terminal disclaimer.

(21) Appl. No.: 13/628,174

(22) Filed: Sep. 27, 2012

(65) Prior Publication Data

US 2013/0043880 A1    Feb. 21, 2013

Related U.S. Application Data

(63) Continuation of application No. PCT/EP2011/054976, filed on Mar. 31, 2011.

(30) Foreign Application Priority Data

Mar. 31, 2010 (EP) .................................. 10158654

(51) Int. Cl.
*G01R 31/14* (2006.01)
*H02H 3/33* (2006.01)
*H02H 3/16* (2006.01)

(52) U.S. Cl.
CPC *H02H 3/337* (2013.01); *H02H 3/16* (2013.01)

(58) Field of Classification Search
CPC ......... G01R 31/025; H02H 3/337; H02H 3/16
USPC ................................................ 324/509–510
See application file for complete search history.

(56) References Cited

U.S. PATENT DOCUMENTS

| 4,138,707 A | 2/1979 | Gross |
| 4,837,519 A | 6/1989 | Lopetrone et al. |

(Continued)

FOREIGN PATENT DOCUMENTS

| DE | 19826410 A1 | 1/1999 |
| DE | 10253864 A1 | 6/2004 |

(Continued)

OTHER PUBLICATIONS

International Search Report & Written Opinion Dated Jun. 16, 2011 for International Application No. PCT/EP2011/054976.

(Continued)

*Primary Examiner* — Patrick Assouad
*Assistant Examiner* — Demetrius Pretlow
(74) *Attorney, Agent, or Firm* — Eschweiler & Associates, LLC

(57) ABSTRACT

For the purpose of determining a fault current component of a differential current which is measured as a current sum over a plurality of lines carrying a current of an AC current generator, an electric signal which depends on generator voltages present at the AC current generator with respect to earth potential and which is in phase with a leakage current component of the differential current is generated. The electric signal is scaled by multiplying it by a scaling factor; and the scaled electric signal is subtracted from the differential current to obtain a remainder. The scaling factor is repeatedly updated such that the effective value of the remainder reaches a minimum at the present value of the scaling factor.

18 Claims, 3 Drawing Sheets

(56) References Cited

U.S. PATENT DOCUMENTS

| | | |
|---|---|---|
| 6,107,560 A | 8/2000 | Takehara et al. |
| 6,172,509 B1 * | 1/2001 | Cash et al. ............... 324/546 |
| 6,392,422 B1 | 5/2002 | Kammer et al. |
| 6,625,551 B1 * | 9/2003 | Gies et al. ............... 702/58 |
| 6,930,868 B2 | 8/2005 | Kondo et al. |
| 2002/0105765 A1 | 8/2002 | Kondo et al. |
| 2003/0067723 A1 | 4/2003 | Suzui et al. |
| 2008/0077336 A1 | 3/2008 | Fernandes |
| 2009/0184717 A1 * | 7/2009 | Ivan et al. ............... 324/522 |
| 2010/0091422 A1 | 4/2010 | Feng et al. |
| 2013/0300428 A1 | 11/2013 | Bettenwort et al. |

FOREIGN PATENT DOCUMENTS

| | | |
|---|---|---|
| EP | 1229629 A2 | 8/2002 |
| JP | 197024553 B | 9/1966 |
| JP | 2008164375 A | 7/2008 |

OTHER PUBLICATIONS

Office Action Dated Jun. 16, 2014 Japanese Patent Application No. 2013-501842.

Non Final Office Action Dated Aug. 24, 2015 U.S. Appl. No. 13/944,940.

* cited by examiner

DETERMINATION OF THE FAULT CURRENT COMPONENT OF A DIFFERENTIAL CURRENT

REFERENCE TO RELATED APPLICATIONS

This application is a continuation of International Application number PCT/EP2011/054976 filed on Mar. 31, 2011 which claims priority to European Application number EP 10158654.3 filed on Mar. 31, 2010.

FIELD

The invention relates to a method of and a device for determining a fault current component of a differential current which is measured as a current sum over a plurality of lines carrying a current of an AC current generator.

BACKGROUND

The German Prestandard DIN V VDE V 0126-1-1 requests that an inverter be separated from a public power grid within specified cut-off periods which depend on the effective value of a differential current suddenly occurring over its grid connections. As already mentioned, the differential current, besides a resistive fault current component, consists of an additional capacitive leakage current component, and these two components are vectorially added to give the differential current. From the requirements of the standardized test arrangement and test procedure for fulfilling said standards, it has to be taken that a quick increase in the fault current alone—even with a dominating high constant leakage current—has to result in a separation of the inverter from the grid. As a rule, the differential current is measured with a differential current transformer whose voltage signal is a measure of the differential current between the phases and the neutral line of the inverter. To ensure the detection of any step of the fault current component as requested by said standards, the fault current component of the differential current has to be determined. Due to the tendency towards developing inverters with increasing power and larger dimensions of the photovoltaic units but without a transformer, the capacitances with respect to earth potential and hence the occurring leakage currents are increased. Due to the use of certain materials for photovoltaic units, this tendency is even increased further. For the purpose of sufficiently sensitively measuring any step of the fault current, the leakage current has to be separated from the differential current. Further, the detection of a step of the fault current becomes increasingly difficult as the sensitivity of the differential current transformer is generally reduced by high leakage currents and thus strongly reduced for fault current occurring at the same time.

For the purpose of separating leakage currents from the voltage signal of a differential current transformer it is known to define all currents measured by the differential current transformer which only vary slowly as leakage currents and to compensate them by an evaluation software. Occurring steps of the fault current may then be calculated vectorially, and they are detectable up to the resolution limit of the digitization of the voltage signal of the differential current transformer. In this procedure, however, any steps of the leakage current will erroneously be interpreted as fault currents. Additionally, the resolution of the digitization limits the maximum leakage current at which steps of the fault current are still detected as requested.

From EP 1 229 629 A2 it is known to filter a differential current between the input lines of an inverter connected to a photovoltaic unit by means of an electric circuitry to determine the fault current component of the differential current. Specifically, frequency components of the inverter having typical frequencies of the leakage current generated by the operation of the inverter are filtered off to remove the leakage current component from the differential current. Particularly, with the limitation to only two main frequencies accomplished here, this known method proves insufficient to effectively remove the essential leakage current component from the differential current in practice.

Further, a method of and a device for determining a fault current component of a differential current which is measured as a current sum over a plurality of lines carrying a current of an AC current generator are known from EP 1 229 629 A2. By measuring the voltages between the input lines of an inverter of the AC current generator and earth potential, more precisely, by measuring the AC voltage component of these voltages, the driving force of the leakage current included in the differential current is determined. Starting from this voltage signal and fixed stray capacitances, the leakage current is calculated and subtracted from the differential current to obtain the fault current. For example with a photovoltaic unit as a DC current source of the AC current generator, the stray capacitances, however, are not constant but inter alia vary due to rainfall on the photovoltaic panels. Thus, it is not possible to determine the actual leakage current from the voltages of the input lines with respect to earth potential when using a fixed value of the stray capacitances.

A method and an installation for isolation and fault current surveillance in an electric AC current grid, in which a differential current formed by vectorial addition is measured between at least two grid lines and in which the AC current component of the differential current and the phase angle $\phi$ indicating the real power of the AC current component are determined, are known from DE 198 26 410 A1. A load is not only disconnected, if the differential current exceeds a certain operation value, but also, if the product of the amplitude of the AC current component of the differential current and the cosine of the phase angle $\phi$ exceed a predefined operation value. A practical directive how to determine the entire fault current component of the differential current in a simple way, however, is not given by this document.

There still is a need for a method of and a device for determining a fault current component of a differential current, in which the fault current component of the differential current is determined, i.e. separated from the leakage current component of the differential current independently of how high a DC current component and an AC current component of the fault current are, and independently of the extent to which the relevant stray capacitances vary.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a method of determining a fault current component of a differential current which is measured as a current sum over a plurality of lines carrying a current of an AC current generator. This method comprises generating an electric signal which depends on generator voltages present at the AC current generator with respect to earth potential, and which is in phase with a leakage current component of the differential current, scaling the electric signal by multiplying it by a scaling factor, and subtracting the scaled electric signal from the differential current to obtain a remainder. The scaling factor is repeatedly updated such that an effective value of the remainder reaches a minimum at the present value of the scaling factor.

Further, the present invention relates to a device for determining a fault current component of a differential current. This device comprises a differential current transformer which measures the differential current as a current sum over a plurality of lines carrying the current of an AC current generator. The device also comprises a compensation unit which generates an electric signal which depends on generator voltages present at the AC current generator with respect to earth potential and which is in phase with a leakage current component of the differential current. The compensation unit also scales the electric signal by multiplying it by a scaling factor, and subtracts the scaled electric signal from the differential current to obtain a remainder. The compensation unit repeatedly updates the scaling factor such that an effective value of the remainder reaches a minimum at the present value of the scaling factor.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
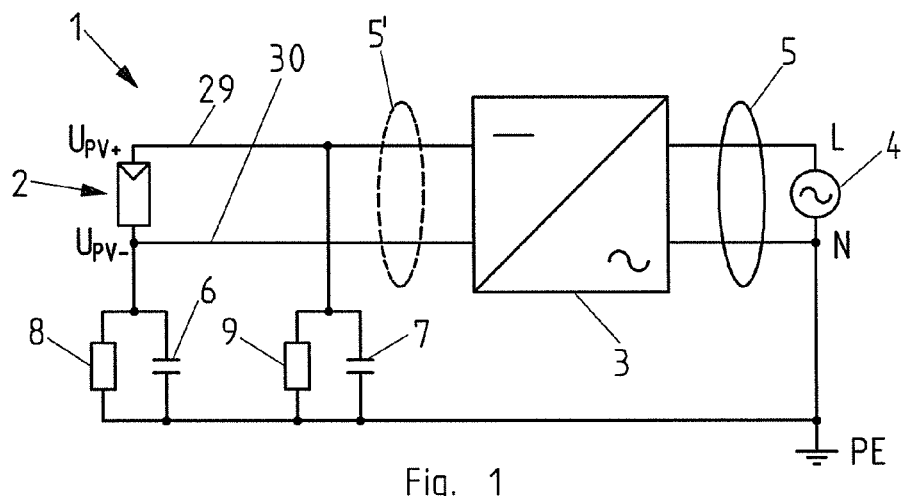
FIG. 1 shows an AC current generator having a photovoltaic unit and an inverter, the reasons for a differential current occurring over the output lines of the inverter being indicated.

Particularly, the AC current generator comprises an inverter which converts a direct current provided by a current source into an alternating current output by the AC current generator. More particularly, the current source may be a photovoltaic unit which, only due to its spatial extension, comprises considerable stray capacitances towards earth potential. Leakage currents towards earth potential are generated by these stray capacitances when potential variations with respect to earth potential occur in operation of the inverter. These leakage currents form a leakage current component of a differential current which is often monitored for quickly noticing any occurrences of fault currents. High leakage currents, however, result in a reduction of sensitivity in detecting fault currents by means of monitoring a differential current. Thus, it is of interest to determine the actual fault current component of a measured differential current.

The formulation "lines carrying the current of an AC current generator" refers to any group or plurality of lines of the AC current generator which together carry the total current of the AC current generator, i.e. the current flowing off the AC current generator and the current returning to the AC current generator. These lines may be the output lines of the AC current generator, but also some other plurality of lines within the AC current generator.

In the present invention, the electric signal which—due to its dependency on the generator voltages which are present at the AC current generator with respect to earth potential and due to being in phase with the leakage current component of the differential current—represents the frequency distribution of the driving force of the leakage current component of the differential current, is multiplied by a scaling factor for taking the actual size of stray capacitances into account. This scaling factor is repeatedly readjusted or updated to reflect the present stray capacitances. The scaling factor is updated such that an effective value of the differential current comprises a minimum after subtraction of the scaled electric signal at the present value of the scaling factor. Both an over-compensation, i.e. the use of a too high scaling factor which corresponds to a higher than the actual stray capacitances, and an under-compensation, i.e. the use of a too low scaling factor which corresponds to a smaller than the actual stray capacitances—after subtraction of the scaled electric signal—result in an effective value of the differential current which is increased over its minimum reached at the scaling factor which exactly corresponds to the actual stray capacitances. In other words, the minimum of the effective value of the differential current is achieved after subtraction of the scaled electric signal exactly at the time when the scaling factor reflects the present stray capacitances in an optimum way. This is due to the fact that the fault current component of the differential current has another frequency and/or phase than the leakage current component and that, thus, there is no danger to remove parts of the fault current component in subtracting the scaled electric signal. Instead, the fault current component always remains after subtracting the scaled signal, and any difference between the remainder of the subtraction of the scaled electric signal from the differential current and the fault current component of the differential current is just a matter of the quality of the compensation of the leakage current component of the differential current by the scaled electric signal.

The formulation that the electric signal "is multiplied by a scaling factor" particularly includes that it is—analogically or digitally—linearly amplified, the amplification factor corresponding to the scaling factor. The formulation, however, also includes the meaning that the electric signal, after a variable pre-amplification, is subtracted several times from the differential current. In this case, the scaling factor results from the product of the pre-amplification factor and the number of times of subtracting.

The formulation that the scaled electric signal "is subtracted from the differential current" includes any procedure in which the differential current or a value representing it is reduced by the electric signal multiplied by the scaling factor according to the preceding definition or by a value corresponding to the electric signal at the correct phase (of the leakage current).

In the present invention, the electric signal which is dependent on the voltages with respect to earth potential present at the AC current generator, which is in phase with the leakage current component of the differential current and which is the basis for the compensation of the leakage current component of the differential current, may be directly tapped at the AC current generator. In this case, the electric signal is no signal which is artificially generated depending on voltages present at the AC current generator, but is actually taken from the AC current generator. For the purpose of taking the electric signal from the AC current generator, however, it may be suitable to make some preparations. Actually, the electric signal may be derived from a leakage current which is generated by the voltages at the AC current generator through measurement capacitors towards earth potential. The electric signal may even be this leakage current which is an image of the entire leakage current component of the differential current, i.e. it has both the same phase and the same frequency distribution. This is due to the fact that, when capacitors like the measurement capacitors and the remaining stray capacitances are connected in parallel, AC currents through the parallel connection are divided over the capacitors proportionally with regard to their capacitances and all have the same phase. The difference between the small capacitances of the measurement capacitors and the much bigger overall stray capacitances is compensated for by the scaling factor. Multiplying the electric signal by the scaling factor thus corresponds to an electronic amplification of the capacitances of the measurement capacitors. When determining the scaling factor for the electric signal according to the present invention, the leakage current through the measurement capacitors towards earth potential multiplied by the scaling factor equals the leakage current component of the differential current.

If capacitors over which a suitable leakage current flows towards earth potential are already present in the AC current generator for other reasons, they may be used as the measurement capacitors so that no additional measurement capacitors have to be provided for carrying out the present invention.

The vectorial subtraction of the scaled electric signal from the differential current may in a simple way be carried out in that scaled electric signal is—as a current of an opposite flow direction—led through a differential current transformer measuring the differential current. The current of the opposite flow direction may, for example, be the scaled leakage current through the measurement capacitors. This procedure which is here referred to as "direct current compensation" corresponds to the compensation of the leakage current component of the differential current by means of a signal of the same frequency and the same amplitude phase-shifted by 180°.

Using a scaled leakage current for compensating the leakage current component of the differential current means a considerable power loss even if the leakage current is several times led through the differential current transformer for realizing a basic scaling. It is, however, an advantage of this current compensation that the differential current transformer is operated in a same operation point, independently of the height of the leakage current component of the differential current as the leakage current component of the differential current is directly compensated. Thus, the differential current transformer is not affected even by high leakage current components of the differential current.

On the other hand, only a small power loss occurs in realizing of the present invention if a voltage proportional to the leakage current flowing through the measurement capacitors is used as the electric signal. After scaling, this voltage may, for example, be subtracted from a voltage signal of a differential current transformer measuring the differential current. This procedure, which is here referred to as "direct voltage compensation", also corresponds to the compensation of the leakage current component of the differential current by a signal of the same frequency and the same amplitude phase-shifted by 180°. If a voltage which drops over a measurement resistor through which a leakage current through the measurement capacitors flows towards earth potential is used as the electric signal, it is to be understood that the resistor connected in series with the measurement capacitors may only be small, as the leakage current flowing through the measurement capacitors would otherwise be subject to an undesired frequency filtering after which it would no longer have the frequency distribution of the leakage current component of the differential current. A small deviation in the frequency distribution of the leakage current through the measurement capacitors from the frequency distribution of the leakage current component to be compensated, however, proves as being irrelevant.

The voltage compensation prior to digitization of the differential current or of its fault current component has the advantage that the resolution of the digitization may be adjusted to the fault current. Generally, however, it is also possible to digitize the electric signal after scaling or even prior to that, and to subtract the digitized . scaled electric signal from the digitized differential current. In this way, the hardware efforts for implementing the present invention may be reduced. A same performance may then, however, require a higher resolution of the A/D converter(s) used.

It is to be understood that the electric signal scaled according to the present invention is not only able to compensate for the leakage current component of the differential current but also documents the present leakage current.

In a simple embodiment of the method of the present invention, the electric signal is generated as a sine signal having at least one main frequency of the generator voltages. This sine signal is then multiplied by the scaling factor to adjust its amplitude according to the criterion of the invention, i.e. that the effective value of the differential current has a minimum after subtraction of the scaled electric signal at the present value of the scaling factor, to the amplitude of the leakage current component of the differential current at this frequency.

To ensure that the sine signal is not only dependent on the voltages at the AC current generator with regard to their main frequency but also is in phase with the leakage current component of the differential current, the phase of the sine signal at each main frequency of the voltages at the AC current generator may also be adjusted to a phase value at which the effective value of the differential current after subtraction of the scaled electric signal reaches a minimum. As a rule, the necessity of such a phase adaptation only occurs once, i.e. not repeatedly, whereas the updating of the scaling factor necessarily occurs repeatedly. Further, there is no need of such a phase adaptation of the electric signal in all embodiments of the method of the present invention in which the electric signal is generated by a leakage current which is generated by voltages at the AC current generator through measurement capacitors towards earth potential. This leakage current already is a frequency and phase true image of the leakage current component of the differential current which only has to be scaled with regard to its amplitude to completely represent the leakage current component of the differential current, i.e. the entire leakage current generated at the AC current generator.

The continuous readjustment or updating of the scaling factor according to the present invention may be carried out by means of a tracking procedure. Here, the scaling factor is varied in small steps and the resulting variations of the effective value of the differential current from which the scaled electric signal has been subtracted are monitored. If the effective value decreases, the scaling factor is once more varied in the same direction, and the effect on the effective value of the differential current is checked again. The tracking procedure continues in the same direction until the effective value of the differential current from which the scaled electric signal has been subtracted starts to increase. Then the tried variation of the scaling factor may be abandoned. At least, the direction of the variation of the scaling factor is changed. Once the scaling factor resulting in the minimum of the effective value has been found, the scaling factor remains constant or only fluctuates minimally. It is to be understood that such a tracking procedure is adjustable both with regard to the consecution of the tracking steps in time and the width of the tracking steps and can thus be optimized. It proves as being an advantage that an occurring fault current lets the effective value of the differential current increase independently on the direction of the variation of the scaling factor and thus freezes in the scaling factor. The tracking procedure thus does not disturb the sensitive detection of the fault current. Nevertheless, it is easily possible to carry out the tracking procedure with quick and sufficiently big steps so that all real changes of the stray capacitances of the AC current generator are sufficiently quickly mapped to avoid erroneously assuming the occurrence of a fault current.

In the new method, the measurement of the differential current may be carried out over the output lines of an inverter of the AC current generator, i. e. downstream of the inverter. This is the usual way in surveying AC current generators having an inverter. On the other hand, generator voltages may be considered, which are present at input lines, i.e. upstream of the inverter. This means that the measurement capacitors for generating a leakage current as a basis for the electric signal for compensating the leakage current component of the differential current according to the present invention are, in one embodiment, connected to the input lines of the inverter.

The device of the present invention has a compensation unit which multiplies the electric signal by the scaling factor prior to subtracting it from the differential current, and it readjusts or updates the scaling factor for the electric signal repeatedly such that, at the present value of the scaling factor, the effective value of the differential current comprises a minimum after subtraction of the scaled electric signal. At this point it may be mentioned that it is sufficient for the device according to the present invention as well as for the method according to the present invention that the value of the scaling factor essentially reaches the corresponding minimum of the effective value of the differential current. Even deviations of some steps of a tracking procedure for repeatedly updating the scaling factors do not matter, as with sufficiently small tracking steps the remaining error remains small, especially as the scaling factor corresponding to the present absolute minimum of the effective value of the differential current fluctuates anyway.

With regard to further particulars of the device according to the present invention reference is made to the description of the method of the present invention.

Referring now in greater detail to the drawings, the AC current generator 1 schematically illustrated in FIG. 1 comprises a photovoltaic unit 2 as a DC current source and an inverter 3 converting the direct current of the photovoltaic unit 2 into an alternating current. Here, the inverter 3 is a single-phase inverter comprising two output lines, i.e. a phase conductor L and a neutral line N. Via the inverter 3 the AC current generator 1 feeds into an AC power grid 4. A differential current occurring over the output lines of the inverter 3 is measured with a differential current transformer 5. Alternatively, the differential current could also be measured over the input lines 29 and 30 of the inverter 3 at which the output voltages $U_{PV+}$ and $U_{PV-}$ of the photovoltaic unit 2 are present, as it is indicated by means of a further differential current transformer 5' indicated by dashed lines. Such a differential current essentially may have two causes. At first, there is a leakage current due to stray capacitances of the photovoltaic unit 2 with respect to earth potential (ground), which are indicated in FIG. 1 by capacitors 6 and 7 connected between each of the input lines 29 and 30 of the inverter 3 and earth potential PE. Further, there is a fault current component of the differential current, which is indicated in FIG. 1 by means of resistors 8 and 9 between the input lines 29 and 30 of the inverter 3 and earth potential PE. These resistors 8 and 9 may represent the isolation resistances of these input lines 29 and 30. With a faultless isolation, the resistances of the resistors 8 and 9 are very high. Correspondingly, the fault current component of the differential current is only small. An isolation fault, however, is associated with a strong increase of the fault current component of the differential current. Such an increase is to be detected quickly, as any isolation fault is a source of danger. Detection of the increase of the fault current component of the differential current also has to occur reliably, even if the increase occurs in the presence of a high leakage current component of the differential current, which does not indicate a faulty condition.

Figure 2:
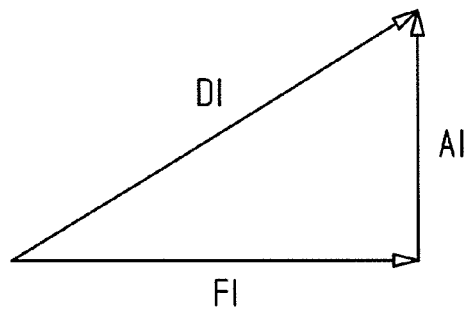
FIG. 2 illustrates the vectorial composition of the differential current of a fault current and a leakage current.

FIG. 2 illustrates the composition of the differential current DI of the fault current component FI and the leakage current component AI, wherein the fault current component FI and the leakage current component AI are vectorially added for the differential current DI, as the fault current component FI is a resistive current and the leakage current component AI is a capacitive current. From FIG. 2 it is apparent that with increasing leakage current component AI an increase in the fault current component FI by a certain value has a decreasing effect on the differential current DI and particularly on the effective value of the differential current DI. Thus, it is of interest to separate the leakage current component AI from the differential current DI or to compensate it in the differential current DI for directly monitoring the fault current component FI.

Figure 3:
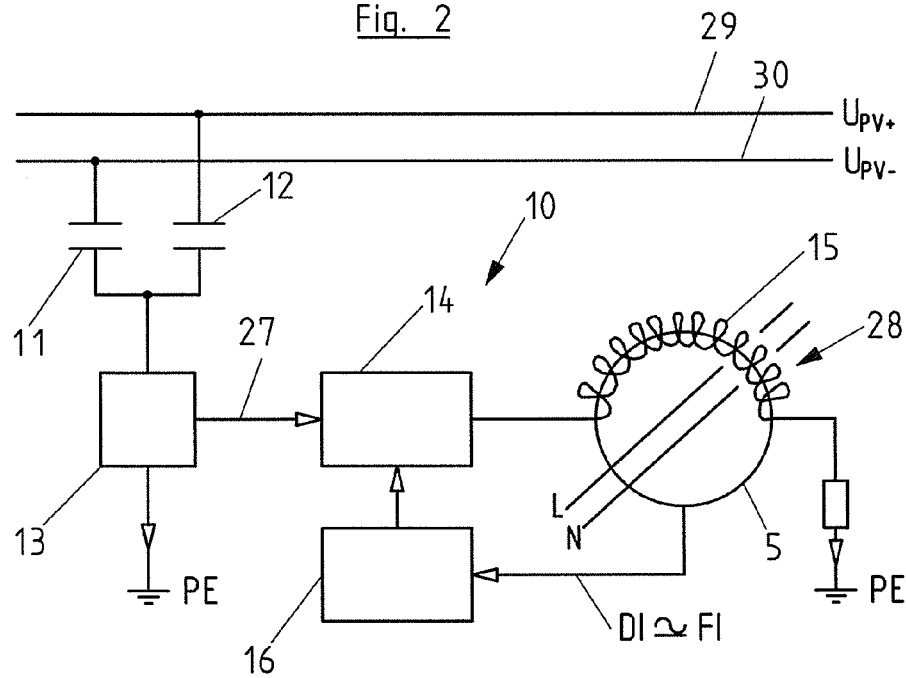
FIG. 3 illustrates a first embodiment of the method of the present invention, which comprises a direct current compensation of the leakage current component of the differential current within a differential current transformer.

This is the purpose of the device 10 for measuring the fault current component of the differential current illustrated in FIG. 3. Measuring capacitors 11 and 12 are connected in parallel to the capacitors 6 and 7 according to FIG. 1, and a current flowing through these capacitors 11 and 12 towards earth potential PE is measured with a current measuring unit 13. In a scaling unit 14, the current measurement value 27 is scaled by multiplication by a scaling factor to consider that the measurement capacitors 11 and 12 only represent a fraction of the total stray capacitances of the photovoltaic unit 2 according to FIG. 1, and that, thus, just a fraction of the total leakage current component AI flows through them. The amplified current is then led through the differential current transformer 5 in opposite direction to the conductors L and N so that it is directly subtracted from the differential current between the L-conductor and the zero or N-conductor. The several windings around the differential current transformer 5 of the conductor 15 carrying the amplified current provides an upward scaling of the amplified current which contributes to the effective scaling factor of a scaled electric signal 28. Finally, the amplified current flows towards earth potential PE via a resistor. The differential current DI measured by the differential current transformer 5 is essentially free from the leakage current component AI and thus corresponds to its fault current component FI. This, however, only applies if the scaling factor by which the scaling unit 14 multiplies the leakage current measured by the current measuring unit 13 is properly set, i.e., if it corresponds to the present size of the stray capacitances. With a proper determination of the scaling factor, the differential current measured by the differential current transformer 5 reaches a minimum of its effective value. To make use of these principles, a logic 16 repeatedly varies the scaling factor in such a way that the effective value of the differential current in fact reaches its minimum. In this way, any variations of the stray capacitances of the photovoltaic unit 2 according to FIG. 1, for example due to rainfall, aging and the like, are automatically compensated.

In a possible modification of the device 10 according to FIG. 3, the scaling unit 14 may amplify the leakage current flowing through the measurement capacitors 11 and 12 towards earth potential PE and then supply the amplified leakage current to the differential current transformer 5.

Figure 4:
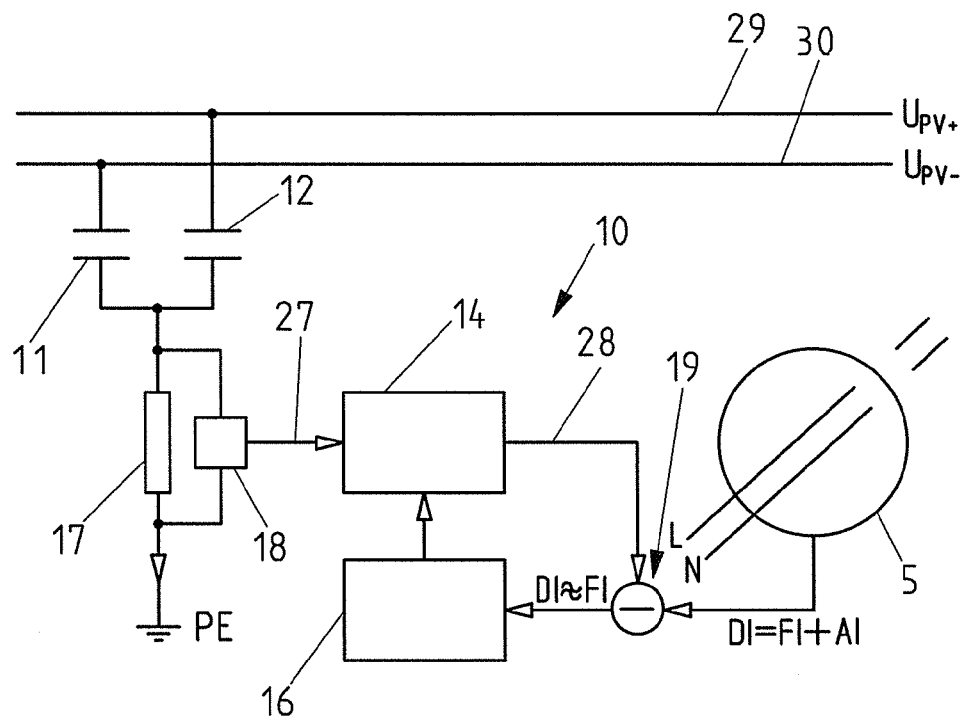
FIG. 4 illustrates an embodiment of the method of the present invention, which comprises a direct voltage compensation of a voltage generated by the leakage current component of the differential current in a differential current transformer.

Whereas in FIG. 3 a compensation of the leakage current component AI of the differential current DI takes place via a current through the differential current transformer 5, a compensation of the leakage current component AI by means of a voltage takes place according to FIG. 4. This is realized in that a voltage dropping over a measurement resistor 17 due to the leakage current flowing through the measurement capacitors 11 and 12 towards earth potential PE is measured with a voltage measuring unit 18. This voltage is multiplied by the scaling factor by the scaling unit 14, and then subtracted as the scaled electric signal 28 from the voltage signal of the differential current transformer 5 in a subtraction node 19. With an optimally adjusted scaling factor, only the fault current component FI of the differential current DI reaches the logic 16 also in this case; and by means of minimizing the effective value of the differential current DI from which the scaled electric signal has been subtracted the adjustment of the scaling factor can be easily optimized.

Figure 5:
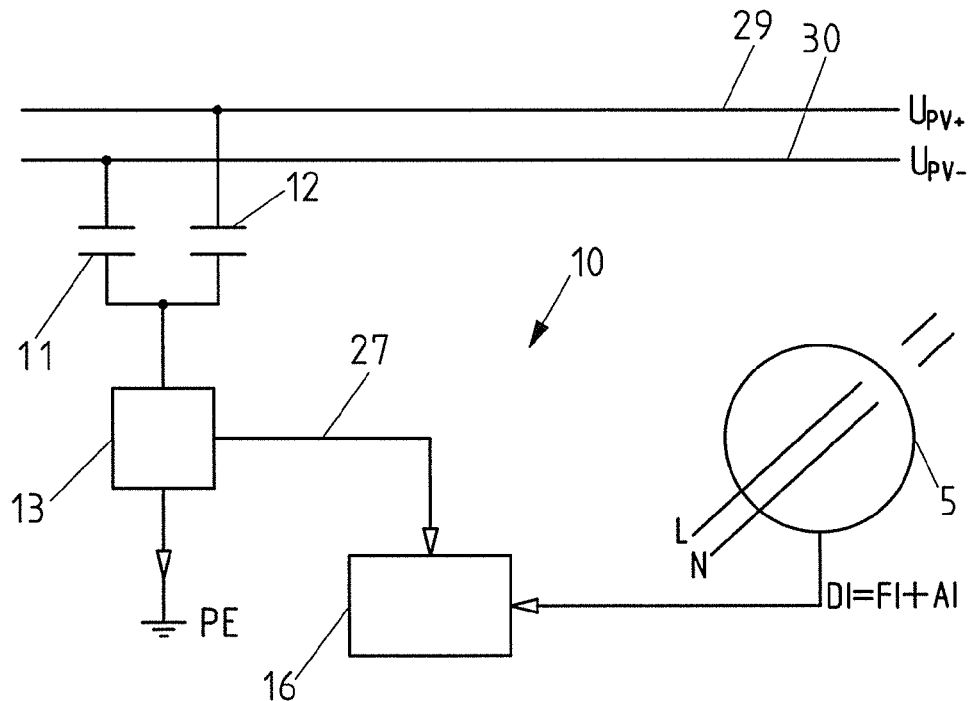
FIG. 5 illustrates an embodiment of the method of the present invention, which comprises a software-based compensation of a voltage generated by the leakage current component of the differential current in a differential current transformer.

According to FIG. 5, the signal of the current measuring unit 13 is directly supplied to the logic 16 which digitizes and scales it in a suitable way to subtract it from the digitized signal of the differential current transformer 5. Here, the scaling factor is also selected in such a way that the effective value of the remaining differential current DI which corresponds to the fault current component FI reaches a minimum.

The advantage of the embodiments of the device 10 according to FIGS. 3 to 5 is that, by the leakage current through the measurement capacitors 11 and 12 towards earth potential or the voltages generated by this leakage current, an electric signal is available which has the same phase and frequency distribution as the leakage current component AI of the differential current DI. The leakage current through the measurement capacitors 11 and 12 differs from the leakage current component AI of the differential current DI only with regard to its amplitude. This, however, can be adjusted my means of the scaling factor which fulfils the criterion of a minimization of the effective value of the differential current DI after subtraction of the scaled leakage current. This applies independently of which frequency components the leakage current may have in the actual operation mode of the inverter 3 according to FIG. 1 or due to other influencing factors.

Figure 6:
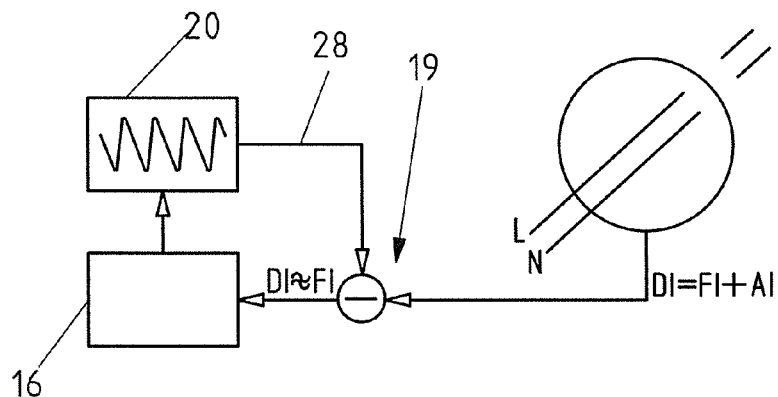
FIG. 6 illustrates an embodiment of the method of the present invention, which comprises a compensation of a voltage generated by the leakage current component of the differential current in a differential current transformer by means of a sine signal.

FIG. 6 illustrates the compensation of only one main component of the leakage current component AI of the differential current DI by means of a sine signal generated by a sine generator 20 at a main frequency of the leakage current. Here, the logic 16 effects a minimization of the effective value of the differential current DI remaining after the subtraction node 19 both by means of adjusting the amplitude and the phase of the sine signal. If the leakage current essentially has one frequency, the leakage current component AI of the differential current DI may essentially be removed in this way.

Figure 7:
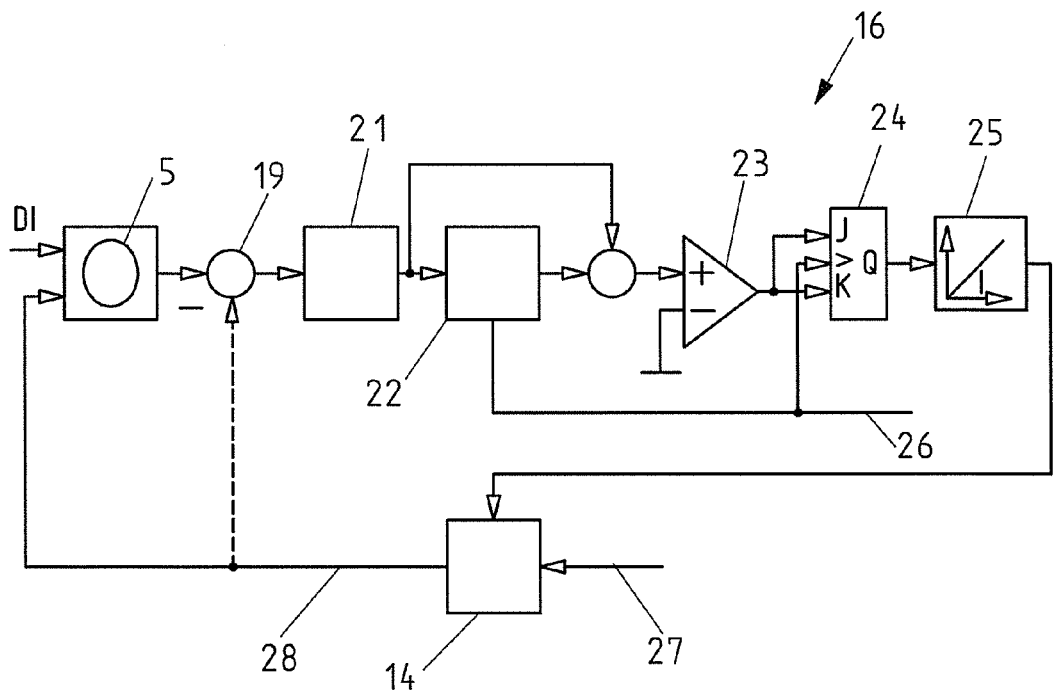
FIG. 7 sketches a tracking procedure for repeatedly readjusting a scaling factor for an electric signal for carrying out the various compensations of the leakage current component of the differential current according to the present invention.

FIG. 7 illustrates a tracking procedure for adjusting the optimum scaling factor at which the effective value of the differential current DI reaches a minimum. Here, the case of the current compensation (according to FIG. 3) is indicated with a full line between the scaling unit 14 and the differential current transformer 5, and the case of the voltage compensation (according to FIG. 4) is indicated with a dashed line to the subtraction node 19. To begin with, the logic 16 includes an effective value former 21, to the output of which a sample and hold stage 22 is connected. The sample and hold stage 22 allows for comparing the present effective value of the differential current DI with a prior effective value. When the effective value variation is negative, i.e. if a decrease of the effective value of the differential current is observed, the tracking procedure proceeds towards the minimum effective value of the differential current, and an integrator determining the amplitude of the feedback compensation signal keeps its direction. If the variation in the effective value determined by the comparator 23 is positive, i.e. if the effective value has increased as compared to the prior effective value, the tracking procedure moves away from the desired minimum. To counteract this tendency, the integration direction of the integrator 25 is changed by changing over a JK-flipflop 24. A scaling factor which previously got higher now gets lower, and a scaling factor which previously got smaller now gets higher. In a tuned state, the scaling factor swings within close limits so that the effective value of the differential current swings about its minimum. For determining the time behaviour of the tracking procedure according to FIG. 7, the following parameters may be adjusted;
a) the time constant of the effective value formation in the effective value former 21;
b) a clock 26 which is supplied to the sample and hold stage 22 and to the JK-flipflop 24; and
c) an integration time constant of the integrator 25,
all these parameters together defining the tracking step frequency and the tracking step width of the tracking procedure.

Many variations and modifications may be made to the preferred embodiments of the invention without departing substantially from the spirit and principles of the invention. All such modifications and variations are intended to be included herein within the scope of the present invention, as defined by the following claims.

What is claimed is:
1. A method of determining a fault current component of a differential current determined as a current sum over a plurality of lines carrying a current of an AC current generator, the method comprising:
generating an electric signal
which depends on generator voltages present at the AC current generator with respect to earth potential, and which is in phase with a leakage current component of the differential current;

scaling the electric signal by multiplying it by a scaling factor; and subtracting the scaled electric signal from the differential current to obtain a remainder;

wherein the scaling factor is repeatedly updated such that an effective value of the remainder reaches a minimum at the present value of the scaling factor.

2. The method of claim 1, wherein the remainder whose effective value reaches the minimum is output as the fault current component of the differential current.

3. The method of claim 1, wherein the scaled electric signal at which the effective value of the remainder reaches the minimum is output as the leakage current component of the differential current.

4. The method of claim 1, wherein the electric signal depending on the generator voltages is tapped at the AC current generator.

5. The method of claim 4, wherein the electric signal is derived from a leakage current flowing through measurement capacitors towards earth potential, which is generated by the generator voltages.

6. The method of claim 5, wherein the electric signal is a voltage proportional to the flowing leakage current.

7. The method of claim 4, wherein the electric signal is a leakage current flowing through measurement capacitors towards earth potential, which is generated by the generator voltages.

8. The method of claim 1, wherein the scaled electric signal is subtracted from the differential current by means of a differential current transformer.

9. The method of claim 1, wherein the scaled electric signal is subtracted from a voltage signal of a differential current transformer.

10. The method of claim 1, wherein the electric signal and the differential current are digitized prior to subtracting the scaled electric signal from the differential current.

11. The method of claim 10, wherein the electric signal is digitized prior to its multiplication by the scaling factor.

12. The method of claim 1, wherein the electric signal is generated as a sine signal having at least one main frequency of the generator voltages.

13. The method of claim 12, wherein, for each main frequency of the generator voltages, the phase of the sine signal is adjusted to a phase value at which the effective value of the remainder reaches a minimum.

14. The method of claim 1, wherein the scaling factor is repeatedly updated according to a tracking procedure.

15. The method of claim 1, wherein the generator voltages are present upstream of an inverter of the AC current generator, and wherein the differential current is determined downstream of the inverter.

16. A device for determining a fault current component of a differential current, the device comprising:

a differential current transformer which measures the differential current as a current sum over a plurality of lines carrying the current of an AC current generator; and a compensation unit which generates an electric signal which depends on generator voltages present at the AC current generator with respect to earth potential and which is in phase with a leakage current component of the differential current, scales the electric signal by multiplying it by a scaling factor, and subtracts the scaled electric signal from the differential current to obtain a remainder;

wherein the compensation unit repeatedly updates the scaling factor such that an effective value of the remainder reaches a minimum at the present value of the scaling factor, and wherein the compensation unit comprises measurement capacitors connected between the AC current generator and earth potential.

17. The device of claim 16, wherein the compensation unit comprises a measurement resistor through which a leakage current through the measurement capacitors flows towards earth potential, and a scaling unit scaling a voltage which drops over the measurement resistor.

18. The device of claim 17, wherein the compensation unit subtracts the scaled voltage from a voltage signal of the differential current transformer.

* * * * *